(12) United States Patent
Tanabe

(10) Patent No.: US 8,350,685 B2
(45) Date of Patent: Jan. 8, 2013

(54) COLLISION DETECTING DEVICE

(75) Inventor: Takatoshi Tanabe, Ichinomiya (JP)

(73) Assignee: Denso Corporation, Kariya (JP)

( * ) Notice: Subject to any disclaimer, the term of this patent is extended or adjusted under 35 U.S.C. 154(b) by 876 days.

(21) Appl. No.: 12/218,485

(22) Filed: Jul. 15, 2008

(65) Prior Publication Data

US 2009/0024323 A1 Jan. 22, 2009

(30) Foreign Application Priority Data

Jul. 17, 2007 (JP) ................................. 2007-186107

(51) Int. Cl.
*B60Q 1/00* (2006.01)
*B60R 21/16* (2006.01)

(52) U.S. Cl. .......... 340/436; 180/274; 280/734; 701/36; 701/45

(58) Field of Classification Search .................. 180/274; 340/436; 280/734
See application file for complete search history.

(56) References Cited

U.S. PATENT DOCUMENTS

| 6,561,301 | B1 * | 5/2003 | Hattori et al. |
| 6,890,009 | B2 | 5/2005 | Murata et al. |
| 2006/0087417 | A1 | 4/2006 | Kiribayashi |
| 2007/0227797 | A1 | 10/2007 | Takahashi et al. |

FOREIGN PATENT DOCUMENTS

| JP | 59-146247 | 9/1984 |
| JP | 11-310095 | 11/1999 |
| JP | 2004-168077 | 6/2004 |
| JP | 2006-117157 | 5/2006 |
| JP | 2006-272988 | 10/2006 |
| JP | 2007-216804 | 8/2007 |
| JP | 2007-237935 | 9/2007 |
| JP | 2007-290682 | 11/2007 |
| WO | WO 2004/058545 | 7/2004 |
| WO | WO 2007/093890 | 8/2007 |

OTHER PUBLICATIONS

U.S. Appl. No. 12/218,483, filed Jul. 15, 2008, Tanabe.
Office action dated May 19, 2009 in corresponding Japanese Application No. 2007-186104.
Office action dated Oct. 20, 2009 in corresponding Japanese Application No. 2007-186104.

* cited by examiner

*Primary Examiner* — Thomas Tarcza
*Assistant Examiner* — Adam Tissot
(74) *Attorney, Agent, or Firm* — Harness, Dickey & Pierce, PLC

(57) ABSTRACT

A collision detecting device includes a chamber member providing a chamber, a pressure sensor connected to the chamber member, and a bumper absorber absorbing an impact generated by collision of an object with the vehicle. The bumper absorber has a region, which has a thickness in a front-rear direction of the vehicle. The thickness of the region is equal to or smaller than a predetermined thickness. The region is in contact with at least a portion of the chamber member. The collision is detected based on the pressure of the chamber detected by the pressure sensor. Hereby, a collision detecting device in which the bumper absorber has sufficient rigidity, and the chamber has sufficient deformability in case of collision can be obtained.

12 Claims, 8 Drawing Sheets

FRONT ⟵⟶ REAR

FRONT ←→ REAR

FRONT ⟵⟶ REAR

COLLISION DETECTING DEVICE

CROSS REFERENCE TO RELATED APPLICATION

This application is based on Japanese Patent Application No. 2007-186107 filed on Jul. 17, 2007, the disclosure of which is incorporated herein by reference.

FIELD OF THE INVENTION

The present invention relates to a collision detecting device for detecting collision of a pedestrian or the like with a vehicle.

BACKGROUND OF THE INVENTION

The conventional obstacle determination device for vehicles is disclosed in JP-A-2006-117157 corresponding to US 2006/0087417 A1 as a pedestrian collision detecting device for detecting collision of a pedestrian or the like with a vehicle. The obstacle determination device includes an absorber, a pressure sensor, a velocity sensor and an airbag ECU device. The absorber is a member for absorbing an impact generated by collision of an object with a vehicle. The absorber includes a chamber member and a connection member. The chamber member is attached to a front surface of a bumper reinforcement by the connection member. Air is filled in a chamber which is provided by the chamber member. The pressure sensor detects a pressure inside the chamber. The pressure sensor is connected to the connection member through a tube. The velocity sensor is a sensor for detecting a velocity of the vehicle and arranged inside the vehicle. The pressure sensor and the velocity sensor are connected to the airbag ECU. The airbag ECU determines based on detecting results of the pressure sensor and the velocity sensor whether collision with a bumper of the vehicle is caused by a pedestrian. Specifically, the airbag ECU determines whether the pressure in the chamber exceeds a threshold value determined by a running velocity of the vehicle.

Standards of vehicles for North America require to have a structure of vehicles that breakage of the vehicle can be suppressed as much as possible even when the collision is caused. Thus, the absorber is made to be rigid. However, when the absorber is rigid, the chamber member is deformed only a little in case of collision is caused. That is, the deformation of the chamber member is limited. Therefore, it becomes difficult to change the pressure inside the chamber and it is difficult to determine the collision of the object with the vehicle accurately.

SUMMARY OF THE INVENTION

In view of the above-described problem, it is an object of the present disclosure to provide a collision detecting device in which a bumper absorber has sufficient rigidity, and a chamber has sufficient deformability in case of collision.

According to a first aspect of the present disclosure, a collision detecting device for a vehicle includes: a chamber member providing a space, and arranged in front of a bumper reinforcement extending in a lateral direction of the vehicle; a pressure sensor connected to the chamber member, and detecting a pressure inside the space; and a bumper absorber absorbing an impact generated by collision of an object with the vehicle, and arranged in front of the bumper reinforcement. The bumper absorber has a region, which has a thickness in a front-rear direction of the vehicle. The thickness of the region is equal to or smaller than a predetermined thickness. The region is in contact with at least a portion of the chamber member. The collision is detected based on the pressure of the space detected by the pressure sensor.

Hereby, a collision detecting device in which a bumper absorber has sufficient rigidity, and a chamber has sufficient deformability in case of collision can be obtained.

According to a second aspect of the present disclosure, a collision detecting device for a vehicle includes: a chamber member providing a space, and arranged in front of a bumper reinforcement extending in a lateral direction of the vehicle; a pressure sensor connected to the chamber member, and detecting a pressure inside the space; and a bumper absorber absorbing an impact generated by collision of an object with the vehicle, and arranged in front of the bumper reinforcement. The bumper absorber includes at least one of a concave portion and a hollow portion. A portion of the chamber member is accommodated in the at least one of the concave portion and the hollow portion. The collision is detected based on the pressure of the space detected by the pressure sensor.

Hereby, a collision detecting device in which a bumper absorber has sufficient rigidity, and a chamber has sufficient deformability in case of collision can be obtained.

According to a third aspect of the present disclosure, a collision detecting device for a vehicle includes: a chamber member providing a space, and arranged in front of a bumper reinforcement extending in a lateral direction of the vehicle; a pressure sensor connected to the chamber member, and detecting a pressure inside the space; and a bumper absorber absorbing an impact generated by collision of an object with the vehicle, and arranged in front of the bumper reinforcement. A rear side end surface of the chamber member is in contact with a front surface of the bumper reinforcement. The bumper absorber includes a main body portion and a deformation portion. A rear side end surface of the bumper absorber is in contact with a front surface of the chamber member. The main body portion extends to a front side of the chamber member and has a predetermined rigidity. The deformation portion extends from a rear side of the main body portion to a rear direction of the vehicle, and a rear side end surface of the deformation portion is in contact with a front surface of the bumper reinforcement. The deformation portion starts to compress and deform the chamber member when a load applied to the main body portion reaches greater than or equal to 2 kN and less than or equal to 6 kN. The collision is detected based on the pressure of the space detected by the pressure sensor.

Hereby, a collision detecting device in which a bumper absorber has sufficient rigidity, and a chamber has sufficient deformability in case of collision can be obtained.

According to a fourth aspect of the present disclosure, a collision detecting device for a vehicle includes: a chamber member providing a space, and arranged in front of a bumper reinforcement extending in a lateral direction of the vehicle; a pressure sensor connected to the chamber member, and detecting a pressure inside the space; and a bumper absorber absorbing an impact generated by collision of an object with the vehicle, and arranged in front of the bumper reinforcement. The bumper absorber has a predetermined rigidity. A rear side end surface of the bumper absorber is in contact with a front surface of the chamber member. A rear side end surface of the chamber member is in contact with a front surface of the bumper reinforcement. The chamber member is compressed and deformed when a load applied to the bumper absorber reaches greater than or equal to 2 kN and less than or equal to 6 kN. The collision is detected based on the pressure of the space detected by the pressure sensor.

Hereby, a collision detecting device in which a bumper absorber has sufficient rigidity, and a chamber has sufficient deformability in case of collision can be obtained.

According to a fifth aspect of the present disclosure, a collision detecting device for a vehicle includes: a chamber member providing a space, and arranged in front of a bumper reinforcement extending in a lateral direction of the vehicle; a pressure sensor connected to the chamber member, and detecting a pressure inside the space; and a bumper absorber absorbing an impact generated by collision of an object with the vehicle, and arranged in front of the bumper reinforcement. The bumper absorber has a predetermined rigidity. A rear side end surface of the bumper absorber is in contact with a front surface of the bumper reinforcement. A rear side end surface of the chamber member is in contact with a front surface of the bumper absorber. The chamber member is compressed and deformed when a load applied to the chamber member reaches greater than or equal to 2 kN and less than or equal to 6 kN. The collision is detected based on the pressure of the space detected by the pressure sensor.

Hereby, a collision detecting device in which a bumper absorber has sufficient rigidity, and a chamber has sufficient deformability in case of collision can be obtained.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

It is noted that the front-rear direction and the up-down direction in drawings indicate the front-rear direction and the up-down direction of the vehicle. In all the embodiments, "the front side" indicates a front side with respect to the traveling direction and "the rear side" indicates a rear side with respect to the traveling direction. Moreover, "the front surface" indicates a surface arranged at the front side with respect to the traveling direction and "the rear surface" indicates a surface arranged at the rear side with respect to the traveling direction.

(First Embodiment)

A structure of a pedestrian collision detecting device for detecting collision with a pedestrian is described with reference to FIG. 1 and FIG. 2.

Figure 1:
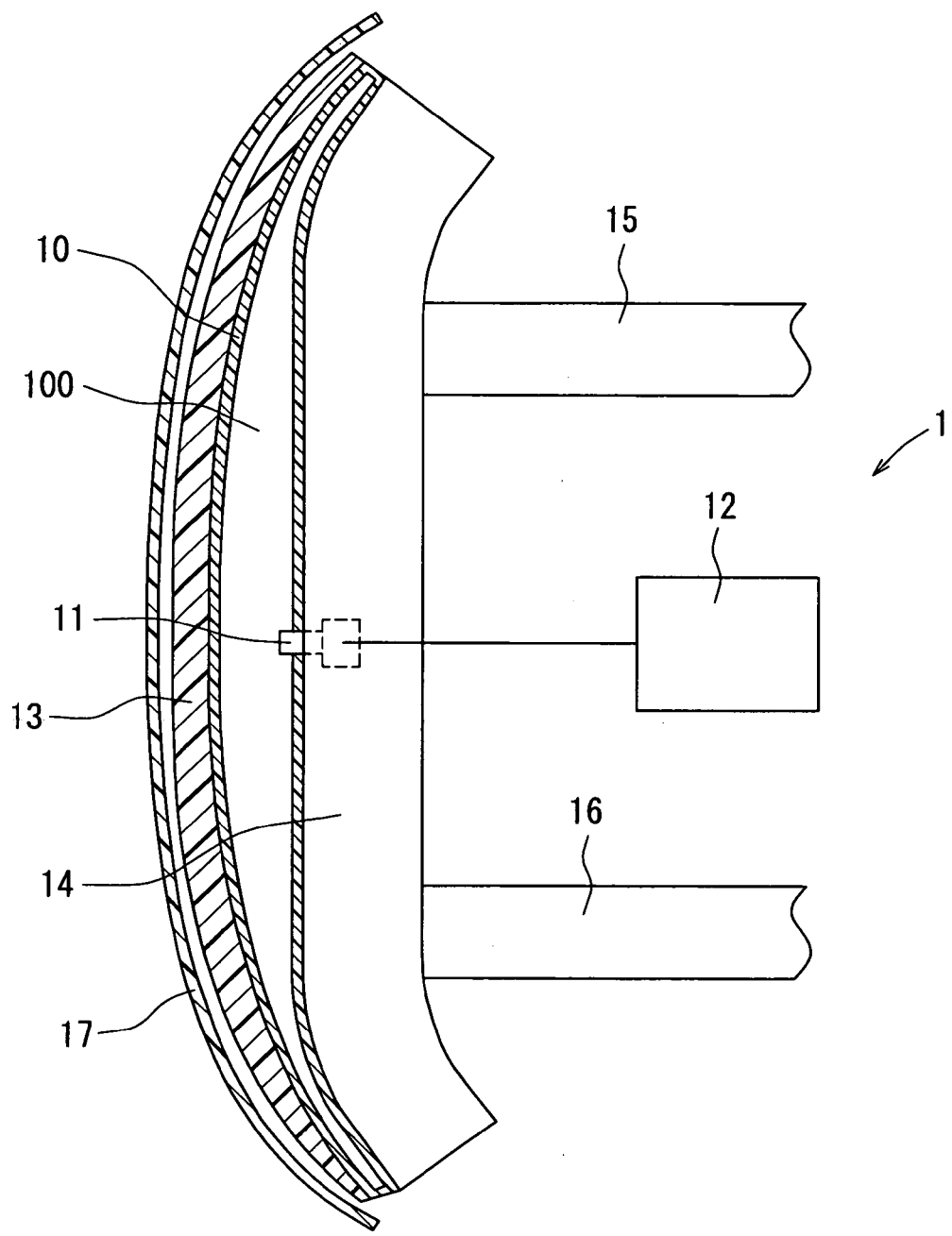
FIG. 1 is a view showing a pedestrian collision detecting device according to a first embodiment.
Figure 2:
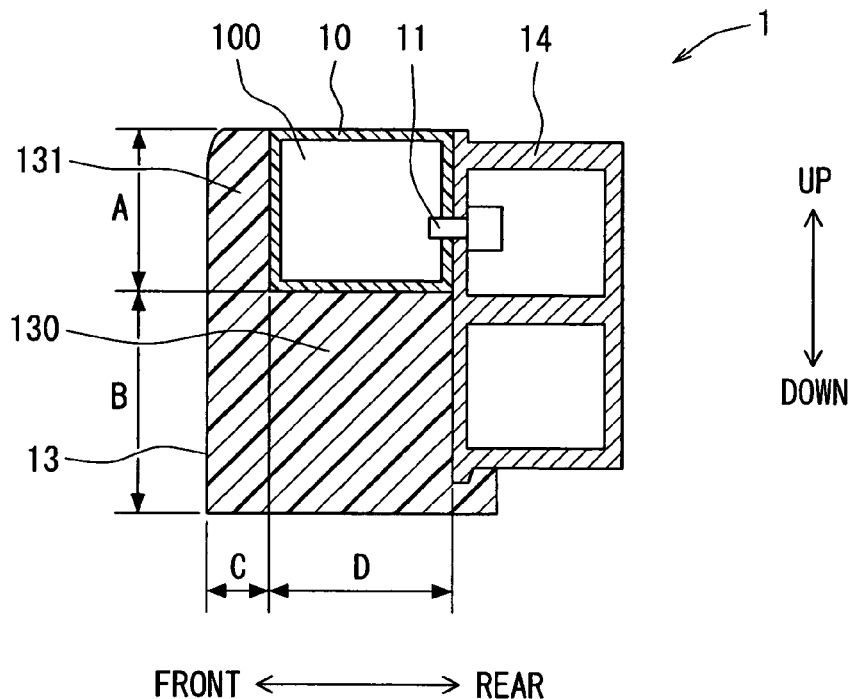
FIG. 2 is a cross sectional view showing a bumper reinforcement, a chamber member and a bumper absorber of the pedestrian collision detecting device according to the first embodiment.

As shown in FIGS. 1 and 2, a pedestrian collision detecting device 1 (a collision detecting device) includes a chamber member 10, a pressure sensor 11, a pedestrian collision determination portion 12 and a bumper absorber 13.

The chamber member 10 is an elongated sack-like member made of such as resin, which has a cross section of a square shape, and provides a chamber 100, which is a sealed space or a substantially sealed space. Air is filled in the chamber 100. The chamber member 10 is arranged on a bumper reinforcement 14 extending in a lateral direction of the vehicle, which has a cross section that substantially two squares are attached in line, so that a rear surface of the chamber member 10 is attached to an upside front surface of the bumper reinforcement 14. The bumper reinforcement 14 is attached to front side end portions of a pair of side members 15 and 16, which extends in the front-rear direction of the vehicle and provides a frame of the vehicle.

The pressure sensor 11 is connected to the chamber member 10 and detects the pressure inside the chamber 100. The pressure sensor 11 is included inside of the bumper reinforcement 14 and connected to the chamber member 10 with an end portion of the pressure sensor 11 protruded to the front side.

The pedestrian collision determination portion 12 determines based on the detecting result of the pressure sensor 11 whether a collided object is a pedestrian and outputs a corresponding signal. For example, the determination portion 12 is a device equipped in a microcomputer. The determination portion 12 is arranged inside the vehicle and connected to the pressure sensor 11.

The bumper absorber 13 is an elongated shape member made of resin, for example. The bumper absorber 13 absorbs an impact generated by a collision of an object with the vehicle. The bumper absorber 13 includes a main body portion 130 and a flexible portion 131. The flexible portion 131, which is thinner than the main body portion 130 in the front-rear direction of the vehicle, is formed in the bumper absorber 13. Thus, a concave portion is formed between the bumper reinforcement 14 and the flexible portion 131.

The main body portion 130 is arranged under the chamber member 10 with a rear side end surface of the main body portion 130 attached to a downside front surface of the bumper reinforcement 14. The main body portion 130 arranged in front of the bumper reinforcement 14 has a predetermined rigidity and a cross section of a substantially rectangular shape. A material and a volume of the main body portion 130 are adjusted so that the main body portion 130 has the predetermined rigidity defined by the standard for North America.

The flexible portion 131 is arranged on a front side end portion of the main body 130 and bends to the rear side according to a load applied to the device at the impact of collision. Specifically, the flexible portion 131 is a plate-like cantilever extending from the front side end portion of the main body portion 130 to an upside of the device. Dimension A of the flexible portion 131 in the up-down direction is set to be greater than or equal to 1/10 and less than or equal to 2/3, more preferably, greater than or equal to 1/10 and less than or equal to 1/5, of Dimension B of the main body portion 130 in the up-down direction. In addition, Dimension C of the flexible portion 131 in the front-rear direction is set to be greater than or equal to 1/10 and less than or equal to 2/3, more preferably, greater than or equal to 1/10 and less than or equal to 1/5, of Dimension D of the main body portion 130 in the front-rear direction. A rear surface of the flexible portion 131 is attached to a front surface of the chamber member 10. That is, the chamber member 10 is arranged at the rear side of the flexible portion 131. An elongated plate-like bumper cover 17 is arranged at the front side of the bumper absorber 13.

An operation of the pedestrian collision detecting device is described with reference to FIGS. 1 and 2.

Power source is applied to the device 1, the pressure sensor 11 and the determination portion 12 start to operate. When a pedestrian collides with the bumper cover 17, the bumper cover 17 deforms to the rear side and the flexible portion 131 of the bumper absorber 13 deforms to the rear side. The main body portion 130 of the bumper absorber 13 absorbs an impact generated by collision by a compressive deformation of the main body portion 130 in the rear direction. The main body portion 130 has the predetermined rigidity defined by the standard or the like. Thus, the bumper absorber 13 can absorb sufficiently the impact without the significant deformation in normal accidents not only in the collision with the pedestrian and a peripheral portion of the bumper is not broken significantly. The bumper absorber 13 includes the flexible portion 131. The flexible portion. 131 bends to the rear side with the deformation of the bumper cover 17 and the chamber member 10 deforms. The pressure inside the chamber 100 increases with the deformation of the chamber member 10. The pressure sensor 11 detects the pressure inside the chamber 100. The determination portion 12 determines based on the detecting result of the pressure sensor 11 whether the collided object is a pedestrian and outputs a corresponding signal.

The bumper absorber 13 of the device 1 includes the main body portion 130 having the predetermined rigidity and the flexible portion 131 which bends to the rear side by the impact. The chamber member 10 is arranged at the rear side of the flexible portion 131. The rigidity of the bumper absorber 13 can be ensured by the main body portion 130. The flexible portion 131 bends to the rear side and the chamber member 10 can deform. Thus, the rigidity of the bumper absorber 13 can be ensured and the chamber member 10 can deform sufficiently by the collision.

The flexible portion 131 is arranged on a front side end portion of the main body 130. The flexible portion 131 is a plate-like cantilever extending to the upside of the device. Therefore, when a load generated by an impact is applied to the device, the flexible portion 131 can bend in the front-rear direction.

In addition, the dimensions of the flexible portion 131, as the cantilever, in the up-down direction and the front-rear direction are set to be greater than or equal to 1/10 and less than or equal to 2/3, more preferably, greater than or equal to 1/10 and less than or equal to 1/5, of the corresponding dimensions of the main body portion 130 in the up-down direction and the front-rear direction, respectively. Since the chamber member 10 and the bumper absorber 13 are attached to the front surface of the bumper reinforcement 14, a space for the arrangement is limited. The dimension of the flexible portion 131 in the up-down direction is set to be greater than or equal to 1/10 and less than or equal to 2/3, more preferably, greater than or equal to 1/10 and less than or equal to 1/5, of the dimension of the main body portion 130 in the up-down direction, and the sufficient volume of the main body portion 130 can be ensured. Thus, the sufficient rigidity of the main body portion 130 can be ensured. In addition, the dimension of the flexible portion 131 in the front-rear direction is set to be greater than or equal to 1/10 and less than or equal to 2/3, more preferably, greater than or equal to 1/10 and less than or equal to 1/5, of the dimension of the main body portion 130 in the front-rear direction, and the flexible portion 131 can be thinned as compared with the main body portion 130. Therefore, the flexible portion 131 can bend sufficiently.

Moreover, the material and the volume of the main body portion 130 are adjusted so that the main body portion 130 has the predetermined rigidity defined by the standard. Thus, the rigidity of the bumper absorber 13 can be ensured sufficiently.

Although the first embodiment shows the example that the flexible portion 131 is the plate-like cantilever extending from the front side end portion of the main body portion 130 to the upside of the device, the flexible portion 131 may have a different structure. The flexible portion 131 may extend to the downside of the device.

(Second Embodiment)

A pedestrian collision detecting device of a second embodiment is described. The second embodiment is a modification of the first embodiment with respect to the structure of the flexible portion.

A structure of the pedestrian collision detecting device is described with reference to FIG. 3. In the second embodiment, only a flexible portion, which has a different structure from the flexible portion of the first embodiment, is described.

Figure 3:
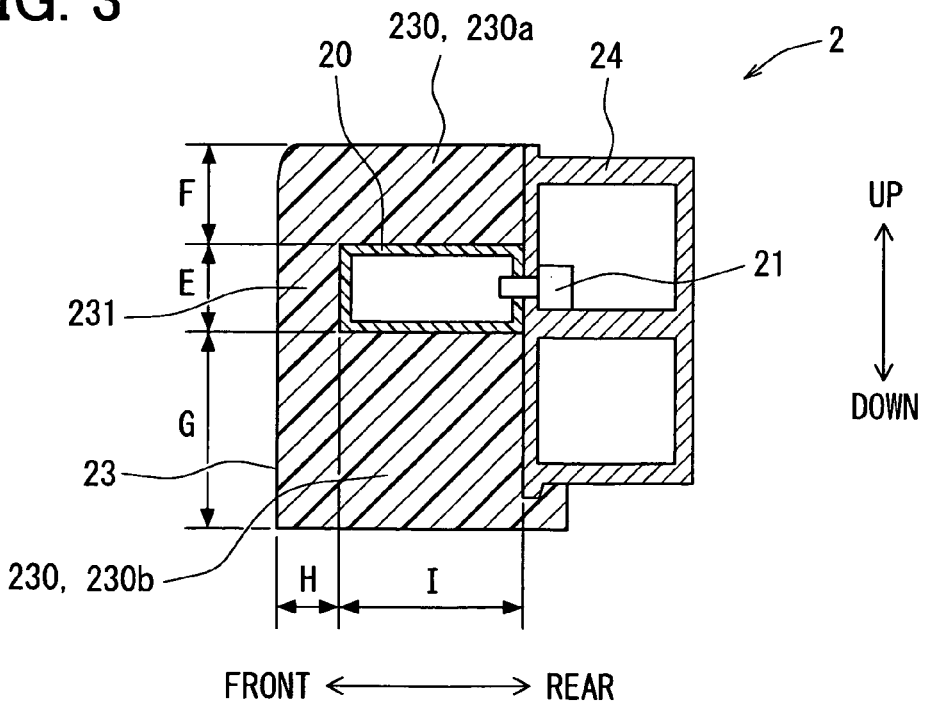
FIG. 3 is a cross sectional view showing a bumper reinforcement, a chamber member and a bumper absorber of a pedestrian collision detecting device according to a second embodiment.

As shown in FIG. 3, a pedestrian collision detecting device 2 (a collision detecting device) includes a chamber member 20, a pressure sensor 21 and a bumper absorber 23.

The chamber member 20 is an elongated sack-like member made of such as resin. The chamber member 20 has a cross section of a square shape, which is elongated in the front-rear direction. The chamber member 20 is arranged on the bumper reinforcement 24 so that a rear surface of the chamber member 20 is attached to a front surface of the bumper reinforcement 24 at a substantially center portion of the front surface in the up-down direction.

The bumper absorber 23 includes a main body portion 230 and a flexible portion 231. A hollow portion, which has Width E in the up-down direction of the vehicle and Width I in the front-rear direction of the vehicle, is formed in the bumper absorber 23. Thus, the flexible portion 231 and the main body portion 230 are formed in the bumper absorber 23.

The main body portion 230 is divided into two parts, that is, an upside main body portion 230a and a downside main body portion 230b. The upside main body portion 230a is arranged on the chamber member 20 with a rear side end surface of the upside main body portion 230a attached to an upside front surface of the bumper reinforcement 24. The upside main body portion 230a, which extends to a front side of the bumper reinforcement 24, has a cross section of a substantially rectangle shape. The downside main body portion 230b is arranged under the chamber member 20 with a rear side end surface of the downside main body portion 230b attached to a downside front surface of the bumper reinforcement 24. The downside main body portion 230b, which extends to the front side of the bumper reinforcement 24, has a cross section of a substantially rectangle shape. A material and a volume of the main body portion 230 are adjusted so that the main body portion 230 has the predetermined rigidity, which is defined by the standard.

The flexible portion 231 is arranged at a middle portion of the main body portion 230 in the up-down direction and bends to the rear side by being applied a load generated by an impact. Specifically, the flexible portion 231 is arranged between a front side end portion of the upside main body portion 230a and a front side end portion of the downside main body portion 230b, and the flexible portion 231 is a plate-like portion having a bridge-shaped beam extending in the up-down direction. Dimension E of the flexible portion 231 in the up-down direction is set to be greater than or equal to 1/10 and less than or equal to 2/3, more preferably, greater than or equal to 1/10 and less than or equal to 1/5, of Dimension F+G of the main body portion 230 in the up-down direction. In addition, Dimension H of the flexible portion 231 in the front-rear direction is set to be greater than or equal to 1/10 and less than or equal to 2/3, more preferably, greater than or equal to 1/10 and less than or equal to 1/5, of Dimension I of the main body portion 230 in the front-rear direction. A rear surface of the flexible portion 231 is attached to a front surface of the chamber member 20. That is, the chamber member 20 is arranged at the rear side of the flexible portion 231.

The flexible portion 231 of the second embodiment is the bridge-shaped beam, both ends of which are supported by the main body portion 230. The device 2 can obtain the same effect with the first embodiment.

(Third Embodiment)

A pedestrian collision detecting device of a third embodiment is described.

A structure of the pedestrian collision detecting device is described with reference to FIGS. 4 and 5.

Figure 4:
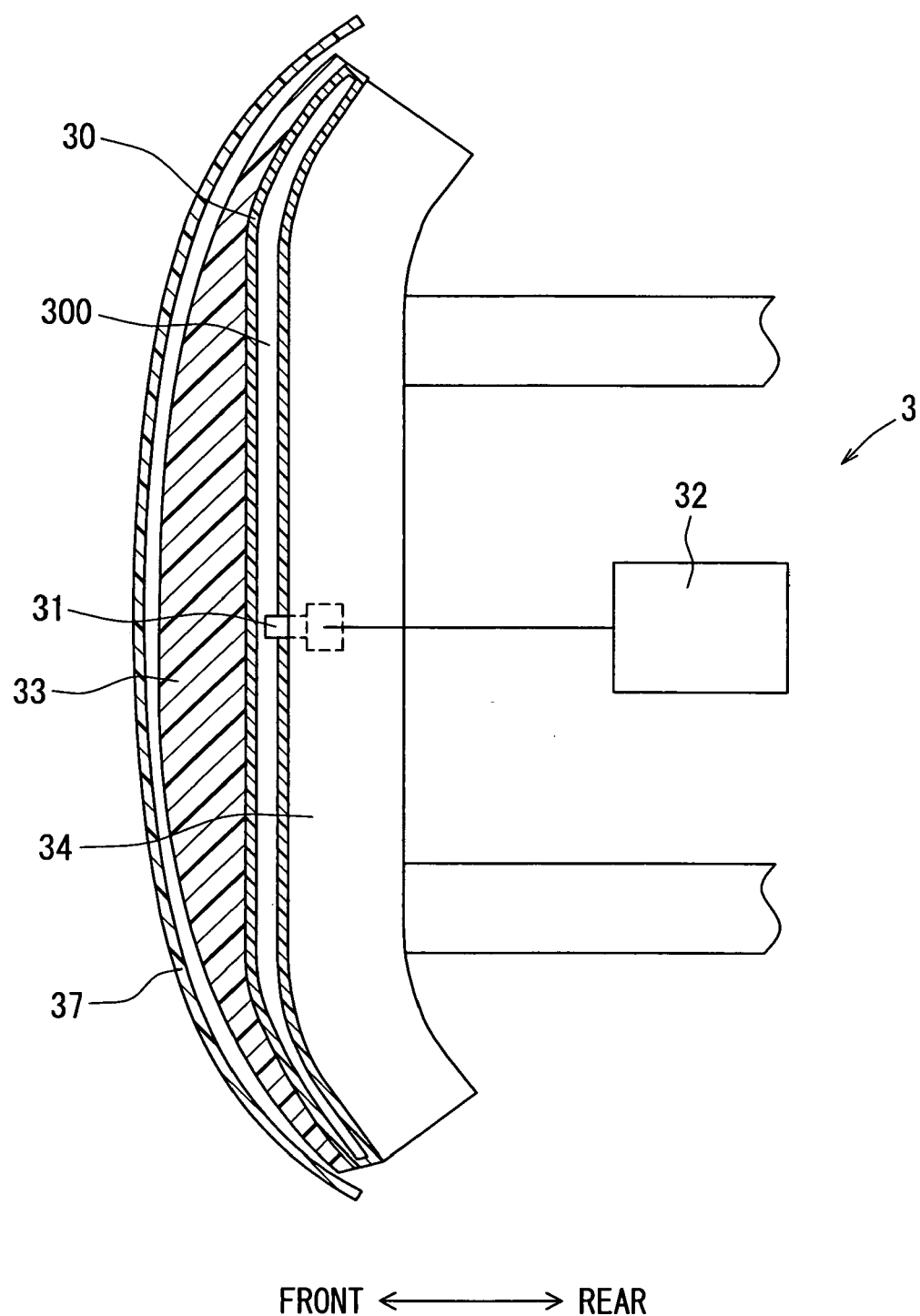
FIG. 4 is a view showing a pedestrian collision detecting device according to a third embodiment.
Figure 5:
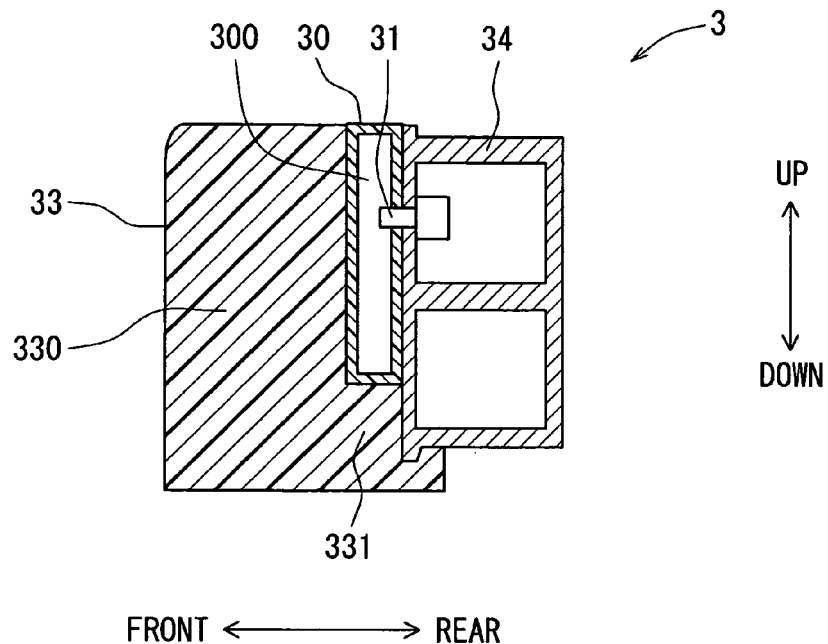
FIG. 5 is a cross sectional view showing a bumper reinforcement, a chamber member and a bumper absorber of the pedestrian collision detecting device according to the third embodiment.

As shown in FIGS. 4 and 5, a pedestrian collision detecting device 3 (a collision detecting device) includes a chamber member 30, a pressure sensor 31, a pedestrian collision determination portion 32 and a bumper absorber 33.

The chamber member 30 is an elongated sack-like member made of such as resin, which has a cross section of a square shape and is elongated in the up-down direction. The chamber member 30 provides a chamber 300. Air is filled in the chamber 300. The chamber member 30 is arranged on a bumper reinforcement 34 so that a rear surface of the chamber member 30 is attached to an upside front surface of the bumper reinforcement 34.

The pressure sensor 31 is connected to the chamber member 30 and detects the pressure inside the chamber 300. The pressure sensor 31 is included inside of the bumper reinforcement 34 and connected to the chamber member 30 with an end portion of the pressure sensor 31 protruded to the front side.

The pedestrian collision determination portion 32 determines based on the detecting result of the pressure sensor 31 whether a collided object is a pedestrian and outputs a corresponding signal. For example, the determination portion 32 is a device equipped in a microcomputer. The determination portion 32 is arranged inside the vehicle and connected to the pressure sensor 31.

The bumper absorber 33 is an elongated member made of such as resin and absorbs an impact generated by collision of an object with the vehicle. The bumper absorber 33 includes a main body portion 330 and a deformation portion 331.

The main body portion 330 is arranged so that a rear side end surface of the main body portion 330 is attached to a front surface of the chamber member 30. The main body portion 330 arranged in front of the chamber member 30 has a predetermined rigidity and a cross section of a substantially rectangle shape. A material and a volume of the main body portion 330 are adjusted so that the main body portion 330 has the predetermined rigidity, which is defined by the standard.

The deformation portion 331 extends from a rear and down side end portion of the main body portion 330 to the rear side of the main body portion 330. A rear end surface of the deformation portion 331 is attached to a downside front surface of the bumper reinforcement 34 and the deformation portion 331 is a portion in which a compressive deformation is caused by an application of a load generated by an impact. The deformation portion 331 is set to compress and deform in the rear direction when the load being applied to the main body portion 330 reaches the predetermined value in the range of greater than or equal to 2 kN and less than or equal to 6 kN, more preferably, greater than or equal to 4 kN and less than or equal to 6 kN, which corresponds to the load when the pedestrian collides with a vehicle. An elongated plate-like bumper cover 37, which is made of such as resin, is arranged at the front side of the bumper absorber 33.

An operation of the pedestrian collision detecting device is described with reference to FIGS. 4 and 5.

When a pedestrian collides with the bumper cover 37, the bumper cover 37 deforms in the rear direction. The main body portion 330 of the bumper absorber 33 absorbs an impact generated by collision by a compressive deformation of the main body portion 330 in the rear direction. The main body portion 330 has the predetermined rigidity, which is defined by the standard or the like. Thus, the main body portion 330 can absorb sufficiently the impact without the significant deformation in normal accidents not only in the collision with the pedestrian. A peripheral portion of the bumper is not broken significantly. When the load being applied to the main body portion 330 reaches the predetermined load, the deformation portion 331 starts to bend in the rear direction. The compressive deformation of the deformation portion 331 is caused, and the chamber member 30 deforms with the compression of the main body portion 330. The pressure inside the chamber 300 increases with the deformation of the chamber member 30. The pressure sensor 31 detects the pressure inside the chamber 300. The determination portion 32 determines based on the detecting result of the pressure sensor 31 whether the collided object is a pedestrian and outputs a corresponding signal.

The bumper absorber 33 of the device 3 includes the main body portion 330 having the predetermined rigidity and the deformation portion 331 in which the compressive deformation is caused by the impact. The chamber member 30 is arranged at the rear side of the main body portion 330. The rigidity of the bumper absorber 33 can be ensured by the main body portion 330. The compressive deformation of the deformation portion 331 is caused in the rear direction so that the chamber member 30 is deformed by the main body portion 330. Thus, the rigidity of the bumper absorber 33 can be ensured and the chamber member 30 can deform sufficiently by the collision. Moreover, the deformation portion 331 is set to compress and deform when the load being applied to the main body portion 330 reaches the predetermined value. The predetermined value is set to be in the range of greater than or equal to 2 kN and less than or equal to 6 kN, more preferably, greater than or equal to 4 kN and less than or equal to 6 kN, which corresponds to the load when the pedestrian collides. The pressure in the chamber 300 changes when the pedestrian or the like collides, and the collision with the pedestrian can be detected.

The deformation portion 331 is arranged under the chamber member 30. When the pedestrian collides with the vehicle, the deformation portion 331 is compressed and deformed in the rear direction. Thus, the chamber member 30 can be deformed sufficiently.

Figure 6:
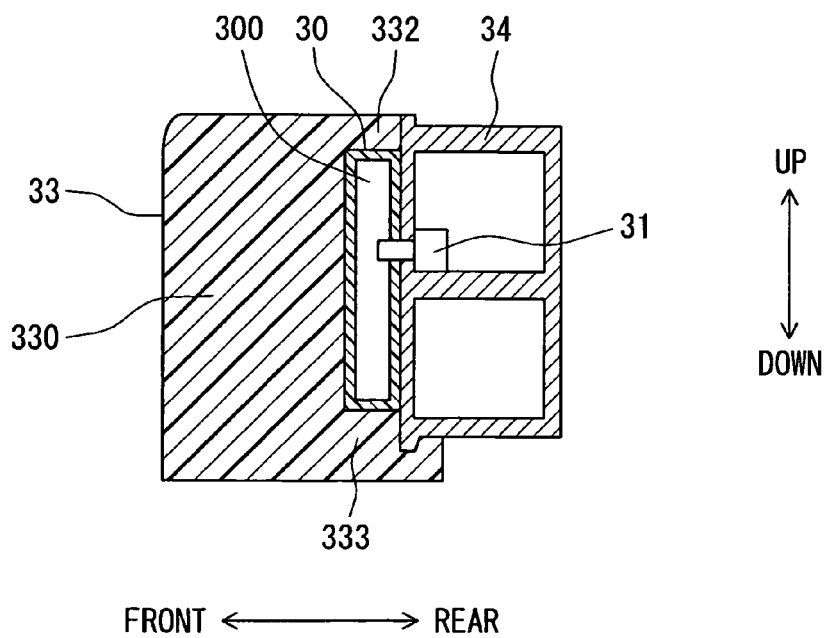
FIG. 6 is a cross sectional view showing a bumper reinforcement, a chamber member and a bumper absorber of a pedestrian collision detecting device according to a modification of the third embodiment.

Although the third embodiment shows the example that the deformation portion 331 is arranged under the chamber portion 30, the structure of the deformation portion 331 may have a different structure. For example, deformation portions 332 and 333 may be arranged on and under the chamber member 30, as shown in FIG. 6. A deformation portion may be arranged either on the chamber member 30 or under the chamber member 30.

(Fourth Embodiment)

A pedestrian collision detecting device of a fourth embodiment is described.

A structure of the pedestrian collision detecting device is described with reference to FIGS. 7 and 8.

Figure 7:
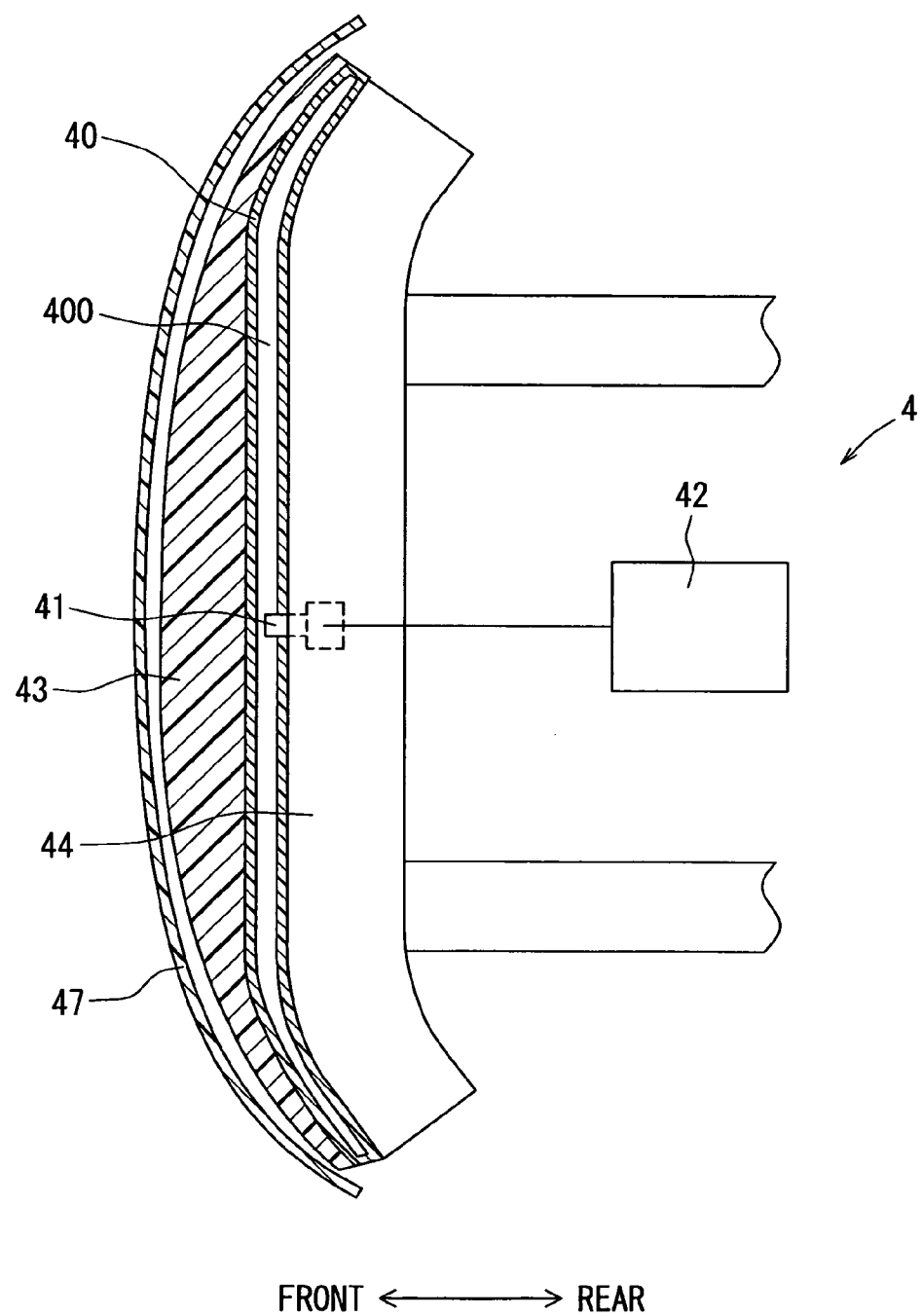
FIG. 7 is a view showing a pedestrian collision detecting device according to a fourth embodiment.
Figure 8:
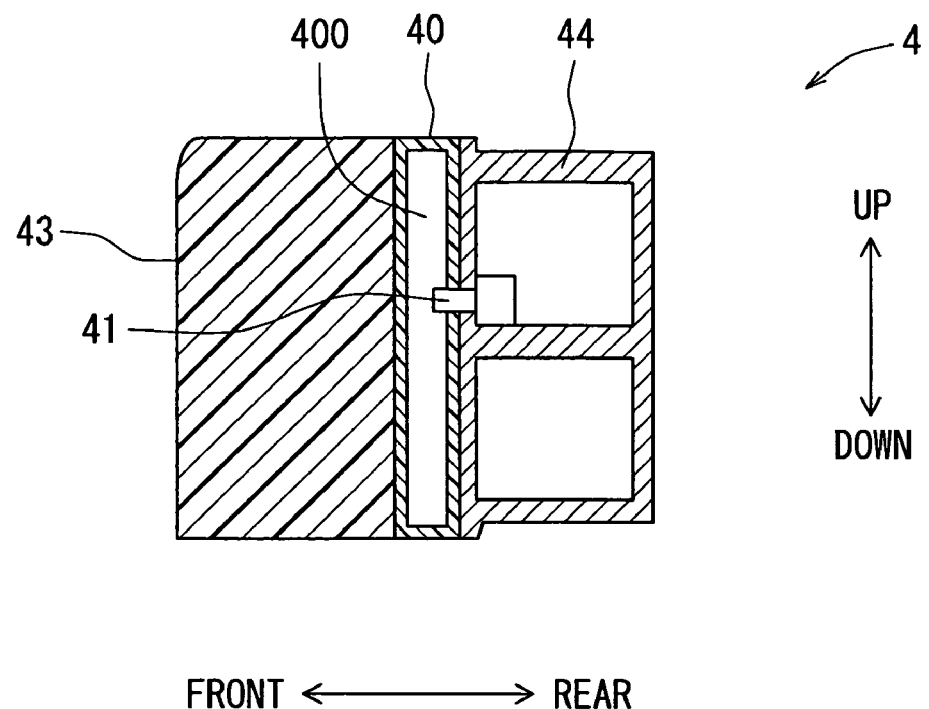
FIG. 8 is a cross sectional view showing a bumper reinforcement, a chamber member and a bumper absorber of the pedestrian collision detecting device according to the fourth embodiment.

As shown in FIGS. 7 and 8, a pedestrian collision detecting device 4 (a collision detecting device) includes a chamber member 40, a pressure sensor 41, a pedestrian collision determination portion 42 and a bumper absorber 43.

The chamber member 40 is an elongated sack-like member made of such as resin, which has a cross section of a square shape and is elongated in the up-down direction. The chamber member 40 provides a chamber 400. Air is filled in the chamber 400. The chamber member 40 is arranged on a front surface of a bumper reinforcement 44 so that a rear surface of the chamber member 40 is attached to the front surface of the bumper reinforcement 44. The chamber member 40 is set to be compressed and deformed in the rear direction when the load being applied to the bumper absorber 43 reaches the predetermined value in the range of greater than or equal to 2 kN and less than or equal to 6 kN, more preferably, greater than or equal to 4 kN and less than or equal to 6 kN, which corresponds to the load when the pedestrian collides.

The pressure sensor 41 is connected to the chamber member 40 and detects the pressure inside the chamber 400. The pressure sensor 41 is included inside of the bumper reinforcement 44 and connected to the chamber member 40 with an end portion of the pressure sensor 41 protruded to the front side.

The determination portion 42 determines based on the detecting result of the pressure sensor 41 whether a collided object is a pedestrian and outputs a corresponding signal. For example, the determination portion 42 is a device equipped in a microcomputer. The determination portion 42 is arranged inside the vehicle and connected to the pressure sensor 41.

The bumper absorber 43 is an elongated member made of such as resin and absorbs an impact generated by collision of an object with the vehicle. The bumper absorber 43 has a predetermined rigidity and a cross section of a rectangular shape. A rear side end surface of the bumper absorber 43 is attached to a front surface of the chamber member 40. A material and a volume of the bumper absorber 43 are adjusted so that the bumper absorber 43 has the predetermined rigidity defined by the standard. An elongated plate-like bumper cover 47, which is made of such as resin, is arranged at the front side of the bumper absorber 43.

An operation of the pedestrian collision detecting device is described with reference to FIGS. 7 and 8.

When a pedestrian collides with the bumper cover 47, the bumper cover 47 deforms in the rear direction. The bumper absorber 43 absorbs an impact generated by collision by a compressive deformation of the bumper absorber 43 in the rear direction. The bumper absorber 43 has the predetermined rigidity, which is defined by the standard or the like. Thus, the bumper absorber 43 can absorb sufficiently the impact without the significant deformation in normal accidents not only in the collision with the pedestrian. A peripheral portion of the bumper is not broken significantly. When the load being applied to the bumper absorber 43 reaches the predetermined load, the chamber member 40 starts to bend in the rear direction. The pressure inside the chamber 400 increases with the deformation of the chamber member 40. The pressure sensor 41 detects the pressure inside the chamber 400. The determination portion 42 determines based on the detecting result of the pressure sensor 41 whether the collided object is a pedestrian and outputs a corresponding signal.

The bumper absorber 43 of the device 4 has the predetermined rigidity. The bumper absorber 43 is arranged on the front surface of the chamber member 40 and the chamber member 40 is arranged on the front surface of the bumper reinforcement 44. Thus, the rigidity of the bumper absorber 43 can be ensured and the chamber member 40 can be deformed sufficiently by the collision. Moreover, the chamber member 40 is set to be compressed and deformed when the load being applied to the bumper absorber 43 reaches the predetermined value. The predetermined value is set to be in the range of greater than or equal to 2 kN and less than or equal to 6 kN, more preferably, greater than or equal to 4 kN and less than or equal to 6 kN, which corresponds to the load when the pedestrian collides. The pressure in the chamber 400 changes when the pedestrian or the like collides, and the collision with the pedestrian can be detected.

(Fifth Embodiment)

A pedestrian collision detecting device of a fifth embodiment is described. The fifth embodiment is a modification of the fourth embodiment and the difference from the fourth embodiment is that an arrangement of a chamber member and a bumper absorber are inverted.

A structure of the pedestrian collision detecting device is described with reference to FIGS. 9 and 10. In the fifth embodiment, only an arrangement of a chamber member and a bumper absorber, which has a different structure from the fourth embodiment, is described.

Figure 9:
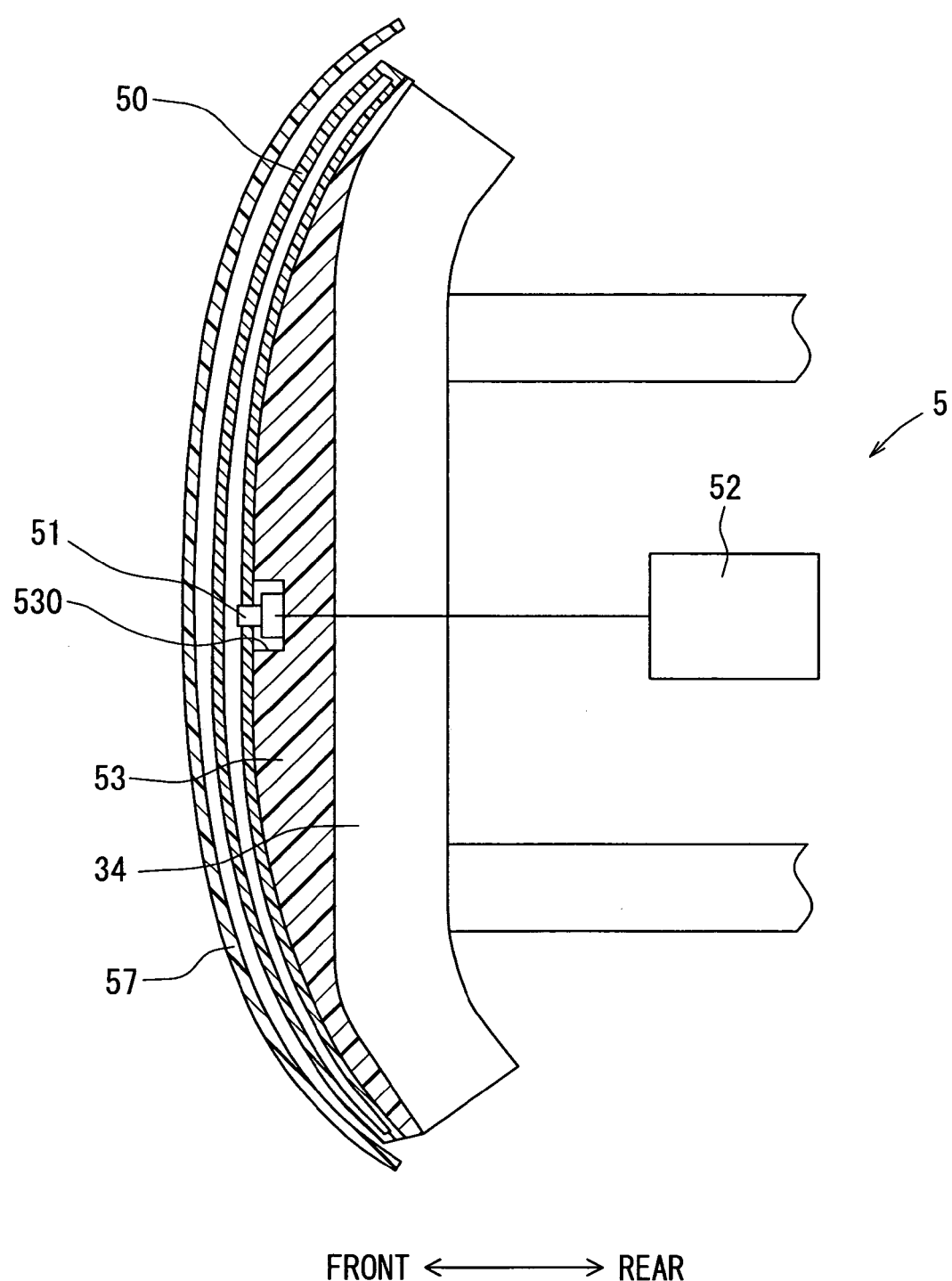
FIG. 9 is a view showing a pedestrian collision detecting device according to a fifth embodiment.
Figure 10:
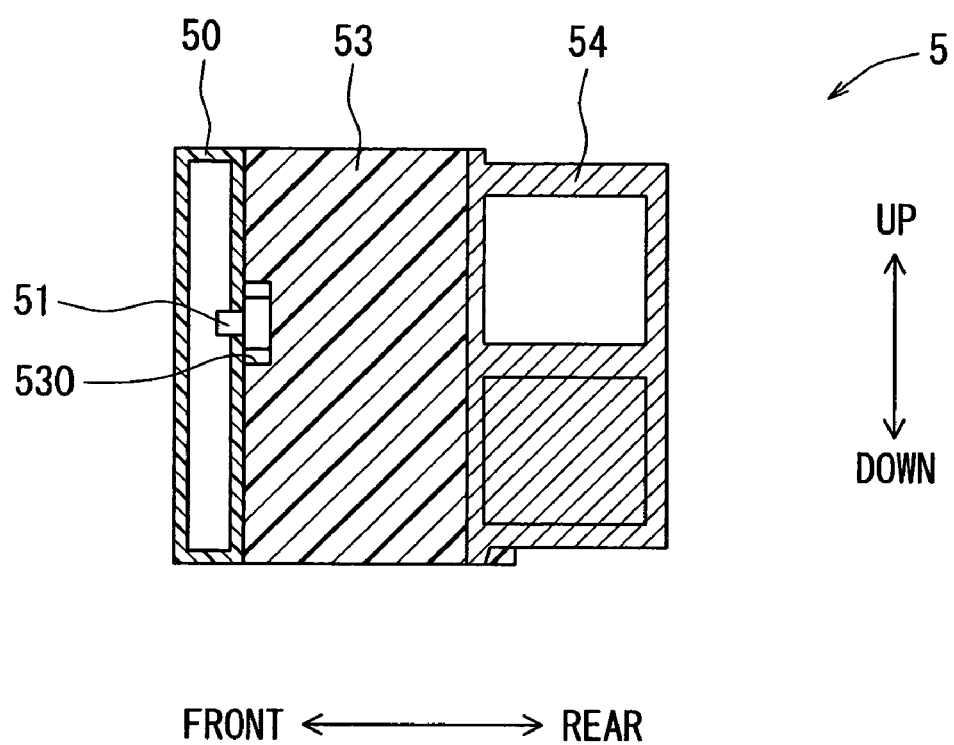
FIG. 10 is a cross sectional view showing a bumper reinforcement, a chamber member and a bumper absorber of the pedestrian collision detecting device according to the fifth embodiment.

As shown in FIGS. 9 and 10, a pedestrian collision detecting device 5 (a collision detecting device) includes a chamber member 50, a pressure sensor 51, a pedestrian collision determination portion 52 and a bumper absorber 53.

The chamber member 50 is arranged on a front surface of a bumper absorber 53 so that a rear surface of the chamber member 50 is attached to the front surface of the bumper absorber 53. The chamber member 50 is set to be compressed and deformed in the rear direction when the load being applied to the chamber member 50 reaches the predetermined value in the range of greater than or equal to 2 kN and less than or equal to 6 kN, more preferably, greater than or equal to 4 kN and less than or equal to 6 kN, which corresponds to the load when the pedestrian collides. A bumper cover 57 is arranged at the front side of the chamber member 50.

The pressure sensor 51 is included in a concave portion 530, which is arranged at a front side end surface of the bumper absorber 53, and connected to the chamber member 50.

The bumper absorber 53 is an elongated member made of such as resin and absorbs an impact generated by collision of an object with the vehicle. The bumper absorber 53 has a predetermined rigidity and a cross section of a rectangular shape. A rear side end surface of the bumper absorber 53 is attached to a front surface of the bumper reinforcement 54. A material and a volume of the bumper absorber 53 are adjusted so that the bumper absorber 53 has the predetermined rigidity defined by the standard.

The device 5 of the fifth embodiment is the modification of the device 4 of the fourth embodiment and the difference from the fourth embodiment is that an arrangement of the chamber member and the bumper absorber are inverted. The device 5 can obtain the same effect with the device 4.

In each of the first to fifth embodiments, although the example that each of the pedestrian collision detecting device 1 to 5 is arranged on the bumper, which is arranged at the front side of the vehicle, is shown, each of the embodiments may provide different structures, respectively. Each of the device 1 to 5 may be arranged at the bumper, which is arranged at the rear side of the vehicle.

Moreover, in each of the first to fifth embodiments, although the example that each of the pedestrian collision determination portion 12, 32, 42 and 52 determines based on the detecting result of each of the pressure sensor 11, 21, 31, 41 and 51 is shown, each of the embodiments may have a different structure. As described above, the pedestrian collision determination portion determines based on the detecting result of the pressure sensor and the velocity sensor.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A collision detecting device for a vehicle comprising:
   a chamber member providing a space, and arranged in front of a bumper reinforcement extending in a lateral direction of the vehicle;
   a pressure sensor connected to the chamber member, and detecting a pressure inside the space; and
   a bumper absorber absorbing an impact generated by collision of an object with the vehicle, and arranged in front of the bumper reinforcement,
   wherein the bumper absorber has a region, which has a thickness in a front-rear direction of the vehicle,
   wherein the thickness of the region is equal to or smaller than a predetermined thickness,
   wherein the region is in contact with at least a portion of the chamber member,
   wherein the collision is detected based on the pressure of the space detected by the pressure sensor,
   wherein a rear side end surface of the bumper absorber is in contact with a front surface of the bumper reinforcement,
   wherein the region is a flexible portion and the bumper absorber further includes a main body portion,
   wherein the main body portion extends to a front side of the bumper reinforcement and has a predetermined rigidity,
   wherein the flexible portion is arranged in front of an end surface of the main body portion, and bends in a rear direction with a load generated by an impact of the collision,
   wherein the flexible portion is a plate shaped cantilever extending from and supported only on the main body portion in an up direction or a down direction of the vehicle, and
   wherein a rear side end surface of the chamber member is in contact with the front surface of the bumper reinforcement, and the chamber member is arranged on a rear side of the flexible portion.

2. The collision detecting device according to claim 1,
   wherein a dimension of the cantilever in the up-down direction is greater than or equal to $1/10$ and less than or equal to $2/3$ of a dimension of the main body portion in the up-down direction, and
   wherein a dimension of the cantilever in the front-rear direction is greater than or equal to $1/10$ and less than or equal to $2/3$ of a dimension of the main body portion in the front-rear direction.

3. The collision detecting device according to claim 1,
   wherein the flexible portion is a bridge-shaped beam having a plate shape, which is disposed at a middle portion of the main body portion in the up-down direction.

4. The collision detecting device according to claim 3,
   wherein a dimension of the bridge-shaped beam in the up-down direction is greater than or equal to $1/10$ and less than or equal to $2/3$ of a dimension of the main body portion in the up-down direction, and
   wherein a dimension of the bridge-shaped beam in the front-rear direction is greater than or equal to $1/10$ and less than or equal to $2/3$ of a dimension of the main body portion in the front-rear direction.

5. The collision detecting device according to claim 1,
   wherein a material and a volume of the main body portion are adjusted to have the predetermined rigidity.

6. The collision detecting device according to claim 1 further comprising a determination means,
   wherein the determination means determines based on the pressure of the space detected by the pressure sensor whether a collided object is a pedestrian.

7. A collision detecting device for a vehicle comprising:
   a chamber member providing a space, and arranged in front of a bumper reinforcement extending in a lateral direction of the vehicle;
   a pressure sensor connected to the chamber member, and detecting a pressure inside the space; and
   a bumper absorber absorbing an impact generated by collision of an object with the vehicle, and arranged in front of the bumper reinforcement, wherein the bumper absorber includes at least one of a concave portion and a hollow portion,
   wherein a portion of the chamber member is accommodated in the at least one of the concave portion and the hollow portion,
   wherein the collision is detected based on the pressure of the space detected by the pressure sensor,
   wherein a rear side end surface of the bumper absorber is in contact with a front surface of the bumper reinforcement,
   wherein the region is a flexible portion and the bumper absorber further includes a main body portion,
   wherein the main body portion extends to a front side of the bumper reinforcement and has a predetermined rigidity,
   wherein the flexible portion is arranged in front of an end surface of the main body portion, and bends in a rear direction with a load generated by an impact of the collision,
   wherein the flexible portion is a plate shaped cantilever extending from and supported only on the main body portion in an up direction or a down direction of the vehicle, and
   wherein a rear side end surface of the chamber member is in contact with the front surface of the bumper reinforcement, and the chamber member is arranged on a rear side of the flexible portion.

8. The collision detecting device according to claim 7,
   wherein a dimension of the cantilever in the up-down direction is greater than or equal to $1/10$ and less than or equal to $2/3$ of a dimension of the main body portion in the up-down direction, and wherein a dimension of the cantilever in the front-rear direction is greater than or equal to $1/10$ and less than or equal to $2/3$ of a dimension of the main body portion in the front-rear direction.

9. The collision detecting device according to claim 7, wherein the flexible portion is a bridge-shaped beam having a plate shape, which is disposed at a middle portion of the main body portion in the up-down direction.

10. The collision detecting device according to claim 9, wherein a dimension of the bridge-shaped beam in the up-down direction is greater than or equal to $1/10$ and less than or equal to $2/3$ of a dimension of the main body portion in the up-down direction, and wherein a dimension of the bridge-shaped beam in the front-rear direction is greater than or equal to $1/10$ and less than or equal to $2/3$ of a dimension of the main body portion in the front-rear direction.

11. The collision detecting device according to claim 1, wherein the chamber member is partially exposed from the bumper absorber and the bumper reinforcement.

12. The collision detecting device according to claim 7, wherein the chamber member is partially exposed from the bumper absorber and the bumper reinforcement.

* * * * *